United States Patent [19]
Walker, Jr. et al.

[11] Patent Number: 5,264,306
[45] Date of Patent: Nov. 23, 1993

[54] LEAD-ACID STORAGE CELL GRID

[75] Inventors: Thomas J. Walker, Jr., Eagan; William A. Cordes; Gordon W. Mixon, Jr., both of St. Paul, all of Minn.

[73] Assignee: Mixon, Inc., St. Paul, Minn.

[21] Appl. No.: 639,573

[22] Filed: Jan. 9, 1991

Related U.S. Application Data

[63] Continuation of Ser. No. 433,758, Nov. 9, 1989, abandoned, which is a continuation-in-part of Ser. No. 270,244, Nov. 14, 1988.

[51] Int. Cl.⁵ .............................................. H01M 2/28
[52] U.S. Cl. .................................... 429/160; 429/211; 429/243
[58] Field of Search ............... 429/160, 161, 211, 178, 429/179, 233, 239, 241–244, 204, 225

[56] References Cited

U.S. PATENT DOCUMENTS

| | | | |
|---|---|---|---|
| 397,796 | 2/1889 | Gibson | 429/239 |
| 704,739 | 7/1902 | Entz | 429/239 |
| 2,883,443 | 4/1959 | Rutschi et al. | 429/161 |
| 3,458,355 | 7/1969 | Radtke | 429/242 |
| 3,640,775 | 2/1972 | Fitchman et al. | 429/161 |
| 4,098,966 | 7/1978 | Brown | 429/161 |
| 4,423,123 | 12/1983 | Okamatsu | 429/160 |
| 4,521,498 | 6/1985 | Juergens | 429/160 X |

Primary Examiner—Anthony Skapars
Attorney, Agent, or Firm—Hugh D. Jaeger

[57] ABSTRACT

Improved lead acid storage cell grid for a storage battery which includes a tab extending upwardly and at right angles from a slotted cell grid. A plurality of like polarity positive or negative interleaved battery grids in a cell are joined into combined tab buses which are then joined to adjacent battery cells to form an internal series connection of the battery cells, thus eliminating the requirement for a top bar current collector and intercell connector.

5 Claims, 12 Drawing Sheets

LEAD-ACID STORAGE CELL GRID

CROSS REFERENCES TO CO-PENDING APPLICATIONS

This application is a continuation of U.S. Ser. No. 07/433,758, filed Nov. 9, 1989, entitled "Lead-Acid Storage Cell Grid", now abandoned, which is a continuation-in-part of U.S. patent application Ser. No. 07/270,244, filed Nov. 14, 1988, entitled "Improved Lead Acid Storage Cell Grid", by Walker et al., now abandoned, and assigned to the same assignee as the present patent application.

BACKGROUND OF THE INVENTION

1. Field of the Invention

This invention relates generally to lead acid storage cells and batteries, and more particularly, to improved grids for lead-acid storage cells and batteries utilizing raised and lowered elevations, the elevations being in respect to the mean plane formed by the grid, with slits selectively defined through the grid and between said raised and lowered elevations.

The present invention also relates the method of connection of common positive or negative polarity cell grids within a cell and their subsequent connection to succeeding cell members within the internal structure of the battery.

2. Description of the Prior Art

A typical lead-acid secondary battery has an inert casing which contains several cells connected in series and employing a sulfuric acid electrolyte. Each cell is made up of positive and negative plates which are interleaved so that the positive and negative plates alternate. Electrically nonconductive separators, often of a microporous nature, are positioned between plates in order to electrically isolate the positive and negative plates from one another while allowing the free passage of the electrolyte.

Each plate comprises an electrically conductive metal grid, usually made of lead or lead alloy, spread with a layer of "leady oxide" paste. The paste is typically made of a combination of lead oxide, lead sulfate, sulfuric acid, water and other conventionally-used additives used in making chemically active lead-acid storage batteries After the battery grids are pasted with such material, the grids are immersed in a dilute sulfuric acid electrolyte and a direct current is applied to the plates. The application of the current to the plate causes the leady oxide paste on plates connected to the positive terminal of the power source to be substantially transformed to lead dioxide, while the paste on the plates connected to the negative terminal of the power source to be substantially transformed to sponge lead. This process is referred to as "forming" in the art. The resultant lead dioxide and sponge lead materials are referred to as battery "active materials." A battery grid, once it has been pasted, is referred to as a battery plate.

As indicated above, lead dioxide is the chemically active material of positive plates and sponge lead is the active material of negative plates. Both active materials, together with the sulfuric acid electrolyte, react together to form lead sulfate and produce an electric current when an electric circuit is made between positive and negative terminals.

Conventional grids are made completely of lead or lead alloy. They are characterized by having an open mesh or grid-like portion for supporting the active paste materials, a surrounding frame including a top bar for collecting the current developed in the plate, and a terminal lug or tab which is either integral or later connected for joining plates of like polarity together within a cell.

Lead is the preferred grid material since it is resistant to corrosion in the battery environment, it is easy to make a desired grid shape, and it is a fairly good electrical conductor. However, in other grids heretofore, pure lead is so soft that it must be alloyed with hardening elements such as antimony or calcium to form a self-supporting grid strong enough to withstand the current typical mechanized grid pasting and cell assembly operations. Alloying materials in lead add to battery manufacturing cost, and the hardening elements in alloyed lead may interfere with battery life or performance. To meet strength requirements, a substantial amount of lead material is required for each grid. Thus, current battery grids made entirely of lead are relatively expensive and contribute substantially to battery weight.

One previous attempt to provide a relatively light-weight grid used a composite grid consisting of plastics in which strands of wire were embedded. U.S. Pat. No. 3,956,012 to Scholle shows such a grid. However, such grids, although light in weight, suffer from current collecting area and current carrying capacity limitations.

Another composite grid was made by first molding a plastic grid shape and thereafter coating a surface with a layer of lead. U.S. Pat. No. 4,221,854 to Hammar et al illustrates a plastic lead composite grid in which a thin continuous layer of lead or lead alloy sheet is coextensively and adhesively bonded to a thicker layer of plastic However, this grid requires several steps in manufacturing to bond the support layer of plastic to the coextensive layer of lead sheet.

Therefore, there is a need for reduced weight battery grid made of pure lead or substantially pure lead which does not require the need for the introduction of other materials or elements, is easy to manufacture an is able to withstand both the process of preparing battery plates and the rigors of battery use in the field.

SUMMARY OF THE INVENTION

The present invention provides a relatively simple, lightweight, easily manufactured, strong electrochemical battery grid. A grid manufactured according to the principles of the present invention provides for raised and lowered portions, with respect to the mean plane formed by the grid, which act to collect current and provide more grid surface area over which to apply leady paste. Holes are selectively defined through the grid, formed between the raised and lowered portions. Through these holes, the leady paste bonds with the leady paste applied to the other side of the grid, thereby providing a strong bond between the leady paste and the grid metal. Preferably, the raised and lowered elevations are arranged in rows. Alternating with the rows of raised and lowered portions are neutral rows (or areas) which act as current conductors to the grid tab.

The present invention also pertains to the tab, which is integral to the grid, and which provides for the elimination of the process whereby additional material (the "top lead") is applied (by hand-burning, cast-on, etc.) to the lugs to provide the cell terminals and interconnections. The tab may be bent for connection with other like polarity plates in the cell and connected to adjoining cells by welding through a cell divider panel or other suitable, well-known securing processes.

The resulting matrix of raised, lowered and neutral areas of the grid lend a structural stability to the lead or lead alloy utilized such that a sheet or foil of lead may be used which is capable of withstanding rigors of fabrication and in-service use.

Another feature of a grid constructed according to the principles of the present invention is that the holes may be formed therethrough without producing scrap. This is accomplished by locating the holes immediately between abutting raised and lowered elevational areas, the hole being aligned approximately normal to the mean plane formed by the sheet.

Another feature of the grid is that it is constructed using a cold process instead of a hot process such as where lead is melted and cast.

Another feature of the grid is that it may incorporate a relatively wide tab which may be connected to an adjoining cell by one or more welds.

Therefore, according to one aspect of the invention, there is provided a battery grid comprising (a) a thin metal sheet, said sheet generally forming a plane, said sheet having a matrix of raised and lowered portions, said raised and lowered portions forming rows, said rows alternating with undisturbed portions; and (b) a current carrying tab connected to said sheet.

Another significant aspect and feature of the present invention is a battery of cells, such cells incorporating tabs which extend from like polarity grids in a cell and are joined into intercell connection structures which are attached to intercell connection structures of adjacent cells to form an improved lead acid battery using novel grids.

While the invention will be described with respect to a preferred embodiment, it will be understood that the invention is not to be construed as limited in any manner by either such embodiment or materials described herein. These and other variations of the invention will become apparent to those skilled in the art upon a more detailed description of the invention.

Advantages and features which characterize the invention are pointed out with particularity in the claims annexed hereto and forming a part hereof. However, for a better understanding of the invention, its advantages and objectives obtained by its use, reference should be had to the Drawing which form a further part hereof and to the accompanying descriptive matter, in which there is illustrated and described a preferred embodiment of the invention.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENT

The principles of the present invention apply particularly well to its application to a battery and/or lead-acid cell grid, hereafter for simplicity referred to as grid 50.

Figure 1:
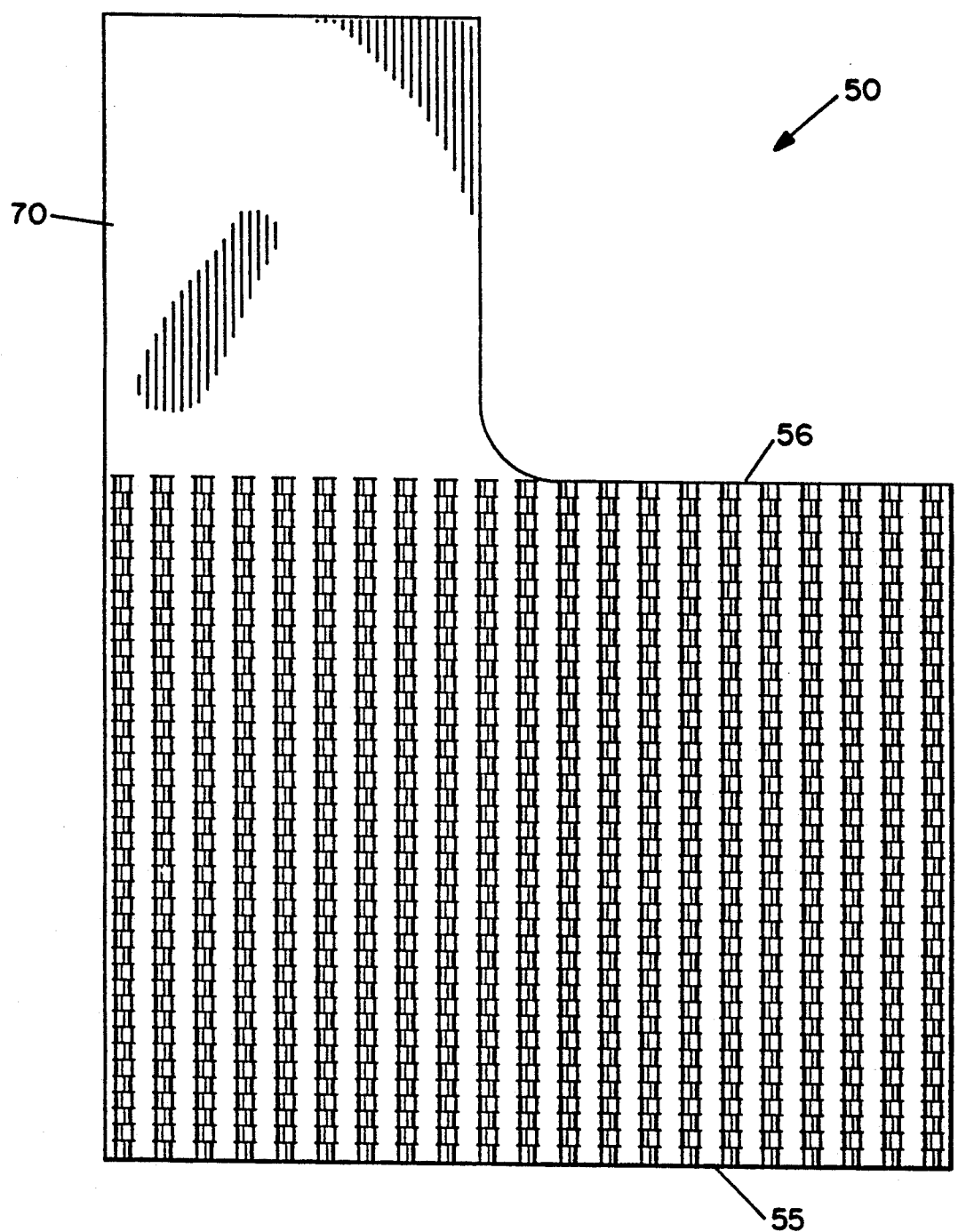
FIG. 1 is a front view of a battery grid constructed according to the principles of the present invention.
Figure 2:
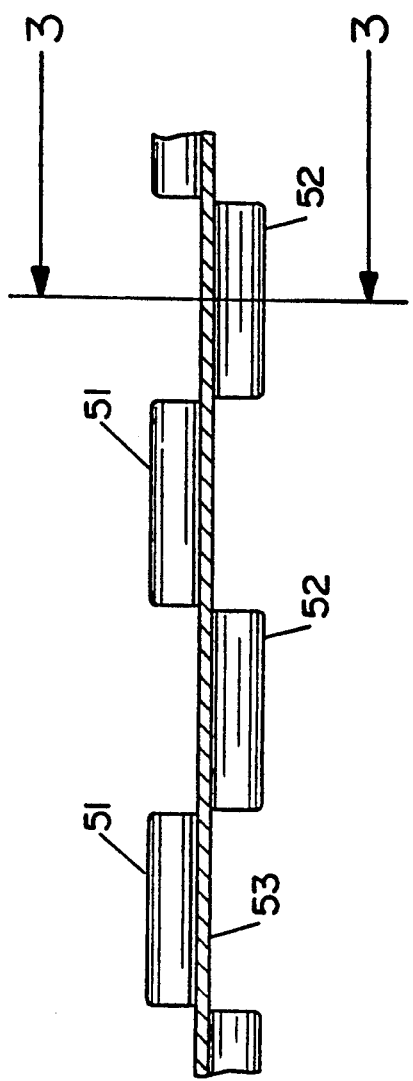
FIG. 2 is a side view taken through line 2—2 of FIG. 3 of the grid of FIG. 1.

An example of a preferred embodiment of a grid 50 constructed according to the principles of the present invention is illustrated in FIG. 1. To construct such a grid 50, a set of opposed counter-rotating rollers each carrying "gear-type" teeth about its peripheral surface to impart an "interrupted corrugated" pattern, such as established in grid 50, might preferably be used. A copending and commonly assigned application describing a process for manufacturing a battery grid constructed according to the principles of this invention is Ser. No. 270,240, entitled "Battery Manufacturing Process", which is hereby incorporated by reference. A second copending and commonly assigned application, Ser. No. 270,245, entitled "Lead-Acid Battery Grid Manufacturing Apparatus", describes an apparatus for manufacturing a grid constructed according to the principles of the present invention, which is also hereby incorporated by reference. Those skilled in the art will recognize that the manufacturing process and apparatus for constructing grid 50 may be subject to design choices, as will become apparent from the following detailed description.

With reference to FIG. 1, there is illustrated a grid 50 with a predefined delimited patterning of raised 51, lowered 52, and neutral 53 portions, with the terms "raised", "lowered" and "neutral" being relative to the mean plane formed by the grid 50. One might, therefore, consider the mean plane of the grid 50 to form an X-Y plane. Neutral portions 53 would lie approximately within this X-Y plane. Raised portions 51 would lie above the X-Y plane and would have a positive Z coordinate (i.e., in an X, Y, Z cartesian system), while lowered portions 52 would lie below the X-Y plane and would have a negative Z coordinate.

Preferably, the raised portions 57 and lowered portions 52 form rows which run from proximate to the bottom edge 55, of grid 50 to proximate to the top edge 56 of grid 50.

Running between the rows of raised 51 and lowered 52 portions is an area, region, or row, which is substantially neutral in elevation with respect to the mean plane defined by the grid 50. These neutral rows 53 provide a current path which is transverse to the top 56 and bottom 55 edges of the battery grid 50. Therefore, running transverse to the top edge are interleaved rows of alternating raised 51 and lowered 52 portions (with slits formed selectively therein) and neutral rows 53.

As noted, these neutral rows 53 serve the function of acting as current paths in the battery grid, while the raised 51 and lowered 52 portions provide greater surface area and area closer to the electrochemical process to gather the current. It will be appreciated by those skilled in the art that the width of neutral rows 53 may be easily adjusted for current carrying considerations and rigidity of the grid 50. The depth of the raised 51 and lowered 52 portions may be adjusted by adjusting the height of the teeth carried by the roller. This depth also affects the rigidity of the grid 50 structure.

Defined by sheared edges of the raised 51 and lowered 52 portions of the grid 50 are slits 60. The slits 60 provide means for fibrous bonding material added to the paste to bond to the paste on the other side of the grid 50. This bonding between the paste on the two sides of the grid 50 provides a more solid pasted plate to avoid blistering and shedding during service life. Paste for grids typically consists of 55-85 wt- % lead oxide and 45-15 wt- % metallic lead. Pasting will not be described further herein since it is not a part of the present invention per se and is well known in the art.

The raised 51 and lowered 52 elevations also provide "concave" area (viewed opposite) in which paste is located thereby further increasing the paste adhesion to the grid 50.

The grid 50 is comprised of a lead or lead alloy and so the entire grid acts as a conductor to tab 70. The advantages of using a pure lead grid 70 is that metal's low resistivity. Other conventional grids use additives which typically increase the resistance and lower the performance. Therefore, high current densities and rapid discharge may be achieved through use of a grid 50.

As alluded above, the grid 50 may be viewed as a matrix of elevations and neutral areas with respect to the mean plane formed by the grid 50. The matrix relates not to two dimensions, but rather to a sort of topographical matrix/set of points of grid 50. The matrix may be defined as a grid (G) as follows, with $a_{nm}$ representing values corresponding to elevations at, above and below (perpendicular to the mean plane) the mean plane formed by the grid 50:

TABLE 1

$$G = \begin{vmatrix} a_{11} & a_{21} & a_{31} & a_{41} & a_{51} & a_n \\ a_{12} & a_{22} & a_{32} & a_{42} & a_{52} & a_{n1} \\ a_{13} & a_{23} & a_{33} & a_{43} & a_{53} & a_{n1} \\ a_{14} & a_{24} & a_{34} & a_{44} & a_{54} & a_{n1} \\ \ldots & \ldots & \ldots & \ldots & \ldots & \ldots \\ a_{1m} & a_{2m} & \ldots & & & a_{nm} \end{vmatrix}$$

If the following values are defined as indicated:
  0 = neutral (i.e., at an elevation approximating the mean plane of the grid;
  +1 = raised to an elevation above the plane; and
  −1 = lowered to an elevation below the plan;
then the rough matrix of elevations of grid 50 may be expressed as follows:

TABLE 2

$$G_{LA} = \begin{vmatrix} 0 & +1 & -1 & +1 & -1 & \ldots & 0 \\ 0 & 0 & 0 & 0 & 0 & & 0 \\ 0 & +1 & -1 & +1 & -1 & & 0 \\ 0 & 0 & 0 & 0 & 0 & & 0 \\ \cdot & \ldots & \ldots & \ldots & \ldots & & \ldots \\ \cdot & & & & & & \\ \cdot & & & & & & \\ 0 & +1 & -1 & +1 & -1 & & 0 \end{vmatrix}$$

wherein the area between +1 and −1 may be selectively sheared with the sheared edges of the lead alloy defining a slit through grid 50 therein. If $a$ is defined as a "hole" or slit, then the matrix may be expressed as follows:

TABLE 3

$$\begin{vmatrix} 0 & +1 & a & -1 & a & +1 & a & -1 & \ldots & 0 \\ 0 & 0 & 0 & 0 & 0 & 0 & 0 & 0 & \ldots & \\ 0 & +1 & a & -1 & a & +1 & a & -1 & \ldots & 0 \\ \cdot & \cdot & \cdot & & & & & & & \\ \cdot & \cdot & \cdot & & & & & & & \\ \cdot & \cdot & \cdot & & & & & & & \\ 0 & +1 & a & \ldots & & & & & \ldots & 0 \end{vmatrix}$$

In both tables 2 and 3, the tab 70, which is preferably an integral undeformed portion (which lies generally in the mean X-Y plane formed by the grid 50), is not represented.

In table 3, the elements "$a$" represent locations where elevated and lowered areas abut. In such a location, the elevation of the surface (considered as a thin sheet or membrane) varies so rapidly that the surface is discontinuous, i.e., the sheet is sheared, making a hole, the boundary of which lies substantially in place; such plane is substantially perpendicular to the mean plane of the metal sheet.

Further it should be appreciated that between "0" locations and "±1" locations, the elevation change is not preferably instantaneous, but rather is of a more gradual slope.

Figure 3:
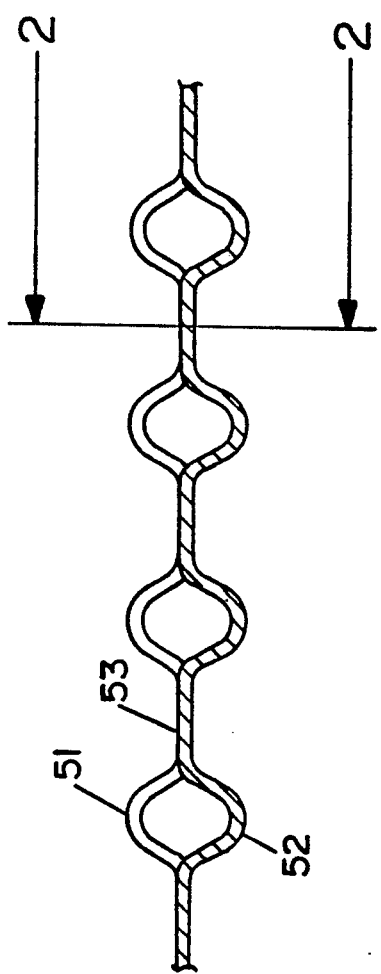
FIG. 3 is a bottom view taken through line 3—3 of FIG. 2 of the grid of FIG. 1.

Next, with reference to FIG. 3, there is illustrated a side view of a grid 50 taken in elevation. Each column of raised 51 and/or lowered 52 areas may be viewed as half-wave sinusoidal. The adjacent column of areas are half-wave sinusoidal shape as well as shifted 180° (i.e. one-half wave length) so as to correspond oppositely. As used herein the term sinusoidal is used generally to describe the rounded shape of the raised and lowered areas as they depart distally from the neutral plane, reach an apex, and return to the neutral plane. Those skilled in the art will recognize that the shape may depend upon several factors including the method of manufacture (i.e., shape of rolling or pressing apparatus utilized), the tensile strength of the material from which the grid 50 is manufactured, and the desired thickness of the end grid 50 and plate. Those skilled in the art will also recognize that the shape may vary from the semicylindrical lobes of the preferred embodiment to ovals, squares and other shapes.

In an alternative embodiment (not shown), other wave shifts, particularly +/−90° (i.e., a quarter-wave shift), may be used. The resulting delimited pattern provides for zig-zag or serpentine rows of raised and lowered abutting portions. The current carrying area may similarly zig-zag (or serpentine) so as to correspond, or may form straight rows between the zig-zagged raised and lowered portions.

Figure 4:
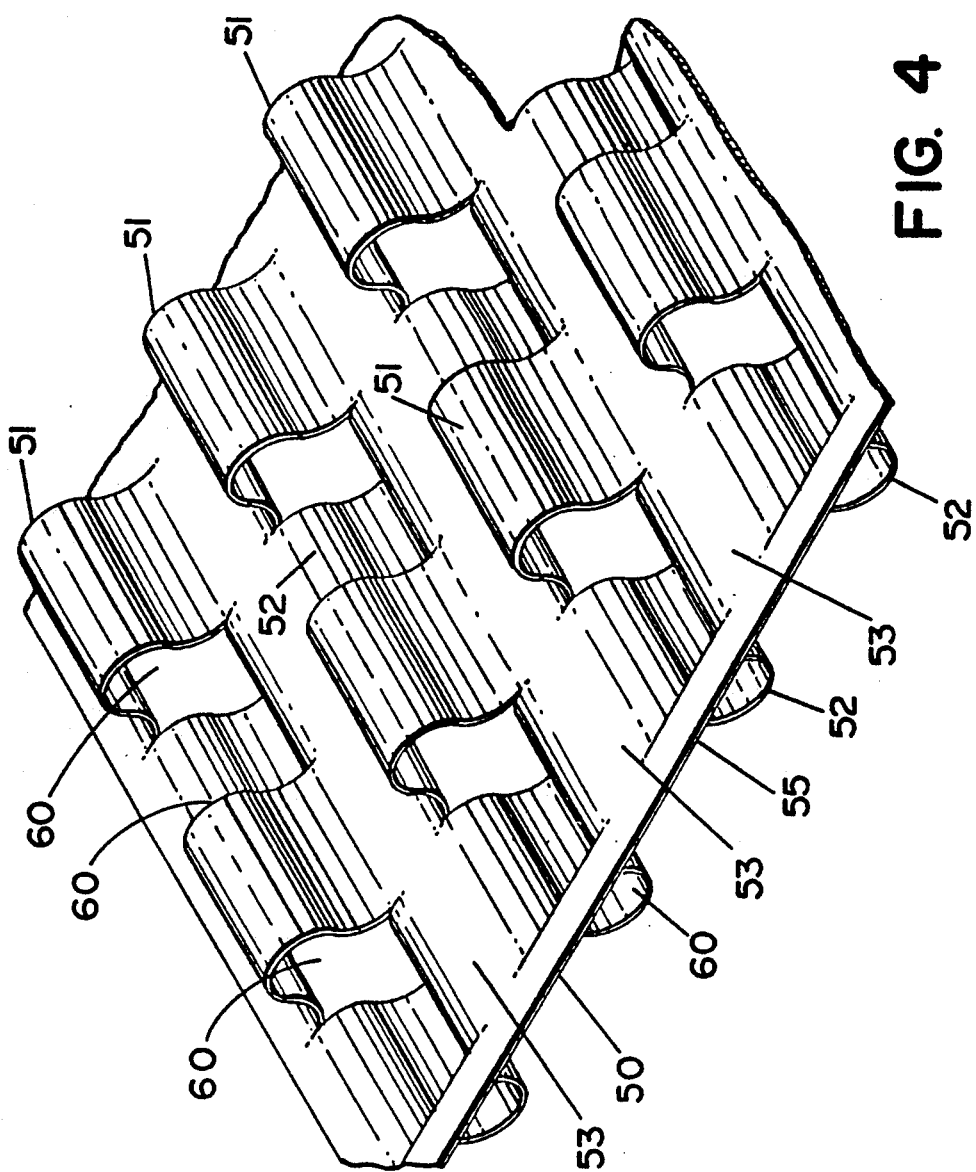
FIG. 4 is a perspective view of a portion of the grid of FIG. 1.
Figure 5:
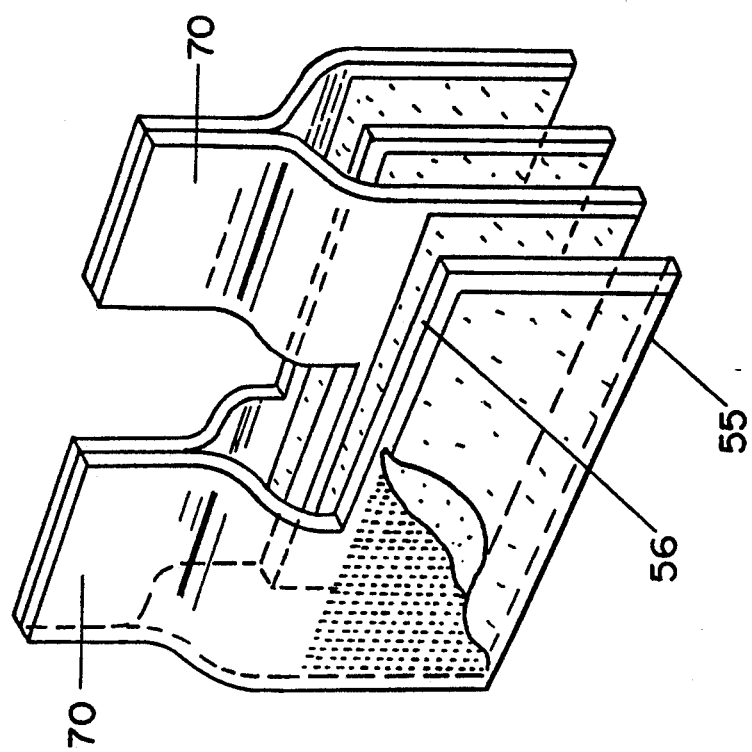
FIG. 5 is a perspective view of a grid of FIG. 1 with its tab connected to a second grid.

Referring next to FIG. 4, there is illustrated a bottom view of a battery grid. It can be easily recognized that viewing the raised 51, lowered 52 and neutral 53 rows from this perspective provides a "square wave" type configuration.

As previously noted, preferably located between the raised 51 and lowered 52 areas are selectively defined slits 60. The slits 60 are defined by the edges of two oppositely deformed semi-cylindrical portions.

Those skilled in the art will recognize that the slits 60 might also be located at various intervals or between various elevational portions as a matter of design. Neutral areas 53 might also be interposed between raised 51 and lowered 52 elevations and still remain within the purview of the present invention. The raised 51 and lowered 52 portions might also be deformed by means of a press type process as those skilled will recognize. Further, those skilled in the art will recognize that in lieu of rollers other types of devices with protrusions to deform the alloy might also be utilized.

The foregoing description provides a detailed description of a grid 50 constructed according to the principles of the present invention. Those skilled in the art will recognize that the local structure of such a grid 50 (e.g., abutting raised and lowered areas with intervening slit) is believed to provide the enhanced characteristics of the grid 50, rather than more macro concerns such as the exact number of rows of raised and lowered areas. These macro concerns, however, are design choices, and should remain well within the purview of the present invention.

Figure 6:
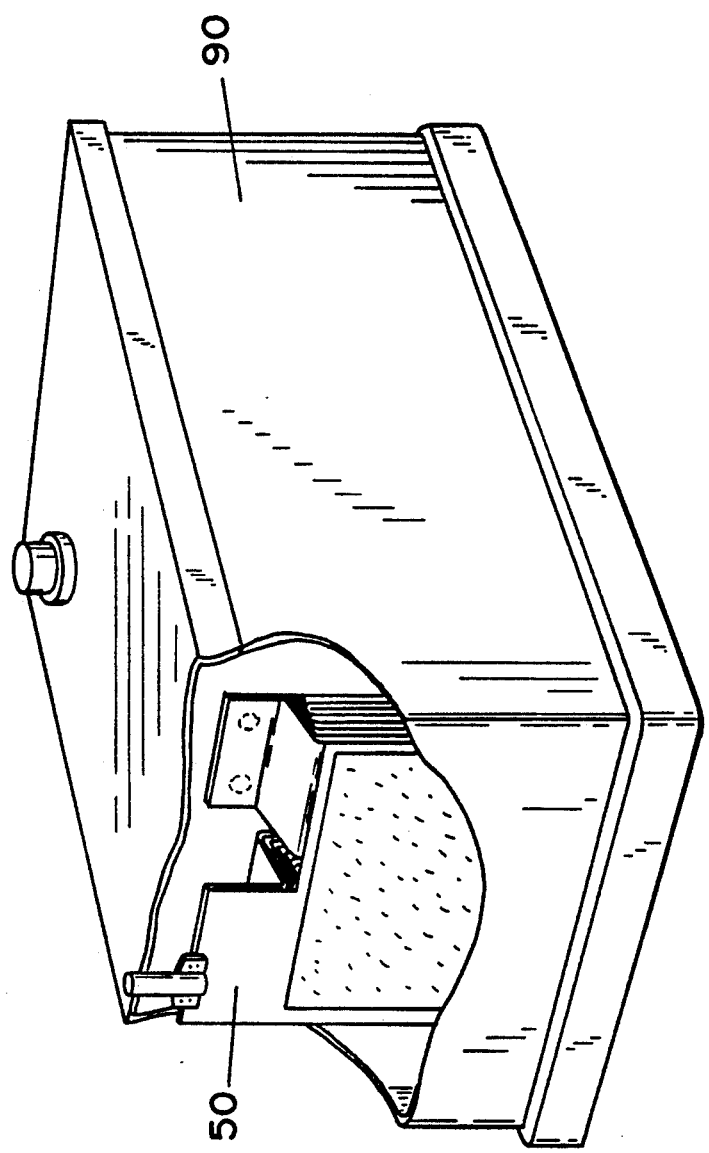
FIG. 6 is a perspective view of a battery with portions broken away incorporating grids of FIG. 1 constructed according to the principles of the present invention.

In FIG. 6, a battery 90 is illustrates which includes grids 50 constructed according to the principles of the present invention. Preferably the grid 50 is approximately 4 ½ inches by 5 ⅜ inches with a cross-sectional thickness of 0.015 inches prior to elevating 51 and lowering 52 the deformities. The tab 70 which is formed as an integral portion of the grid 50 is approximately 2 ½ inches by 3 inches. Each of the foregoing measurements is illustrative only, the tab 70 cross-sectional width and area being governed in part by current carrying considerations which are well known in the art.

Figure 7:
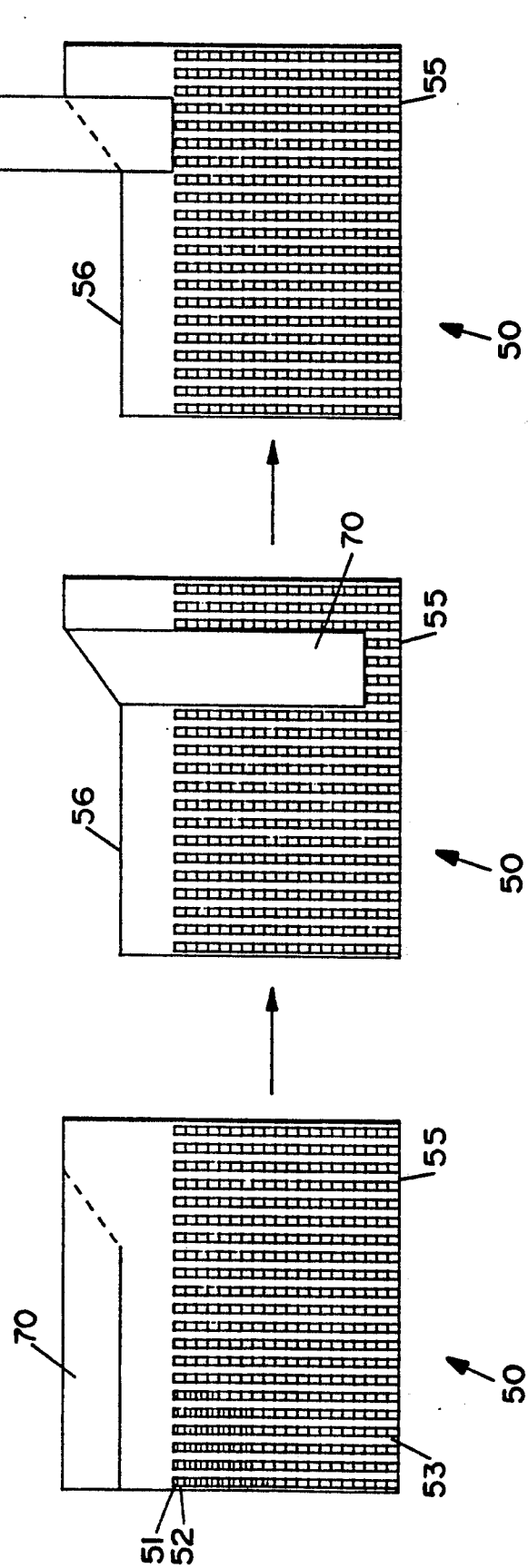
FIG. 7 is an alternative embodiment of the battery grid.

Alternatively, the tab 70 may also be formed (as best seen in FIG. 7) by cutting the grid 50 parallel to the top edge (without cutting across the entire width), folding the cut strip portion down and then folding the cut portion back up. This first fold is an approximate forty-five degree fold with respect to the top edge, while the second fold is parallel to the top edge. Spot welding may also be used to stabilize the folded strip. Those skilled in the art will recognize that other folding sequences and arrangements might be performed (as well as cuts) so as to form tab 70, the design considerations for tab 70 being the current carrying capacity, ability and ease of connecting with plates of similar polarity, and avoiding contact with plates of opposite plurality, among others.

Use of the matrix type pattern hereinabove described allows use of otherwise intractable alloys. The present invention especially adds stiffness to such a grid 50 by providing a rigid geometry. Therefore, a gird 50 constructed according to the principles of the present invention allows use of alloys which previously could not be used due to mechanical concerns. Further, the solid geometry provides a small distance to metal conductors from the active electrochemical reactants. This distance, it is believed, is responsible for the batteries constructed according to the principles of the present invention equivalent or increased performance in relation to conventionally constructed batteries. This distance has recently been shown to be important. See, e.g., Marimoto et al, Computer Simulation of Lead Discharge, 135 J. Electrochemical Society 293 (1987).

The metals used to manufacture the grid are preferably lead and lead alloys, but those skilled in the art will recognize that other transition metals and alloys thereof, including titanium and tantalum may be used. In the preferred embodiment a lead, 8 ppmw copper alloy is used.

It should be noted that lead and/or lead alloy includes at least lead which is pure, high-purity, trace-additive and minor-constituent lead alloy as those terms are known in the art.

It is to be understood that even though numerous characteristics and advantages of the present invention have been set forth in the foregoing description, together with details of the structure and function of the invention, disclosure is illustrative only. Other modifications and alterations are well within the knowledge of those skilled in the art and are to be included within the broad general meaning of the terms to which the appended claims are expressed.

Figure 8:
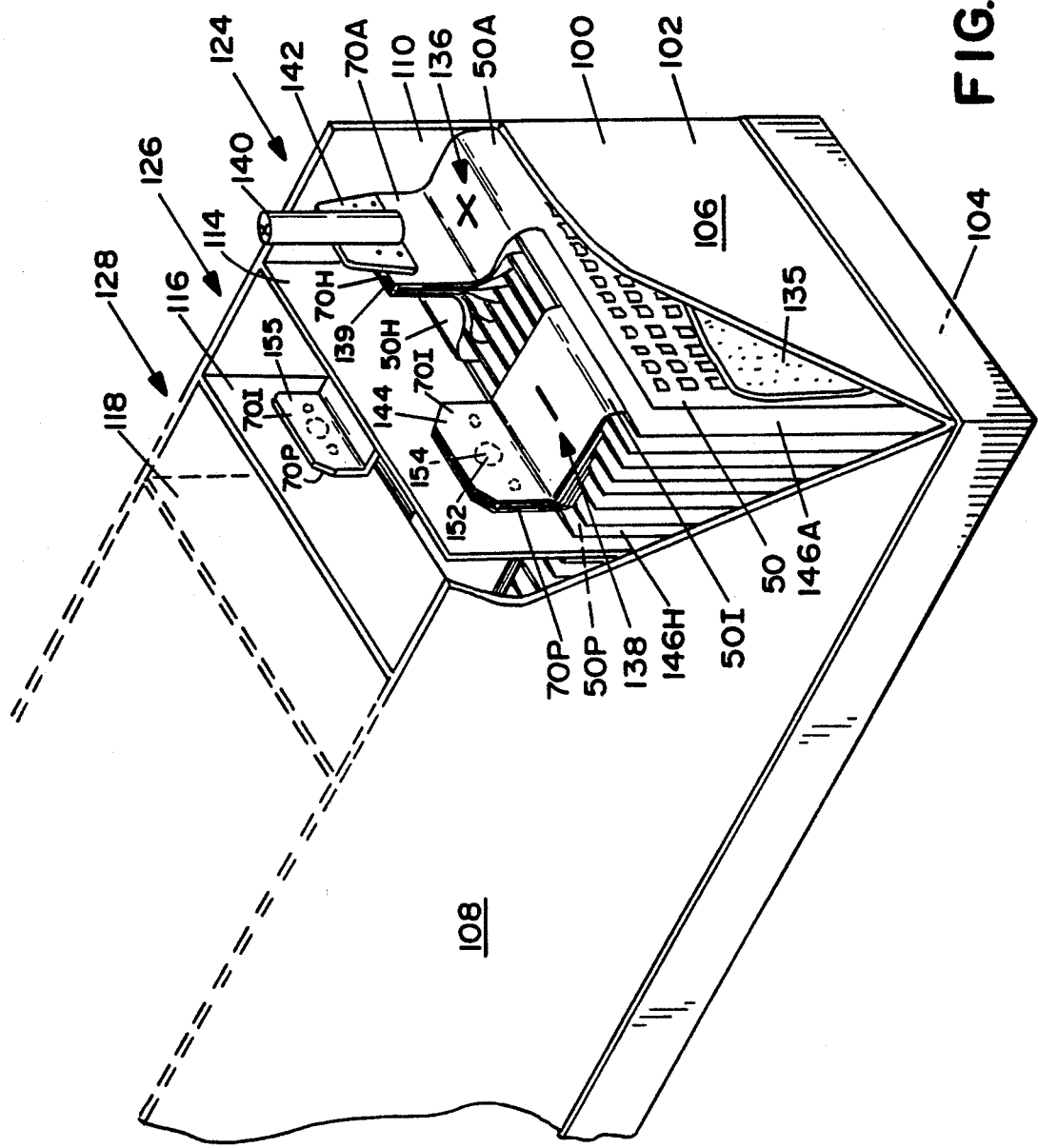
FIG. 8 is a perspective view in cutaway of a battery.
Figure 9:
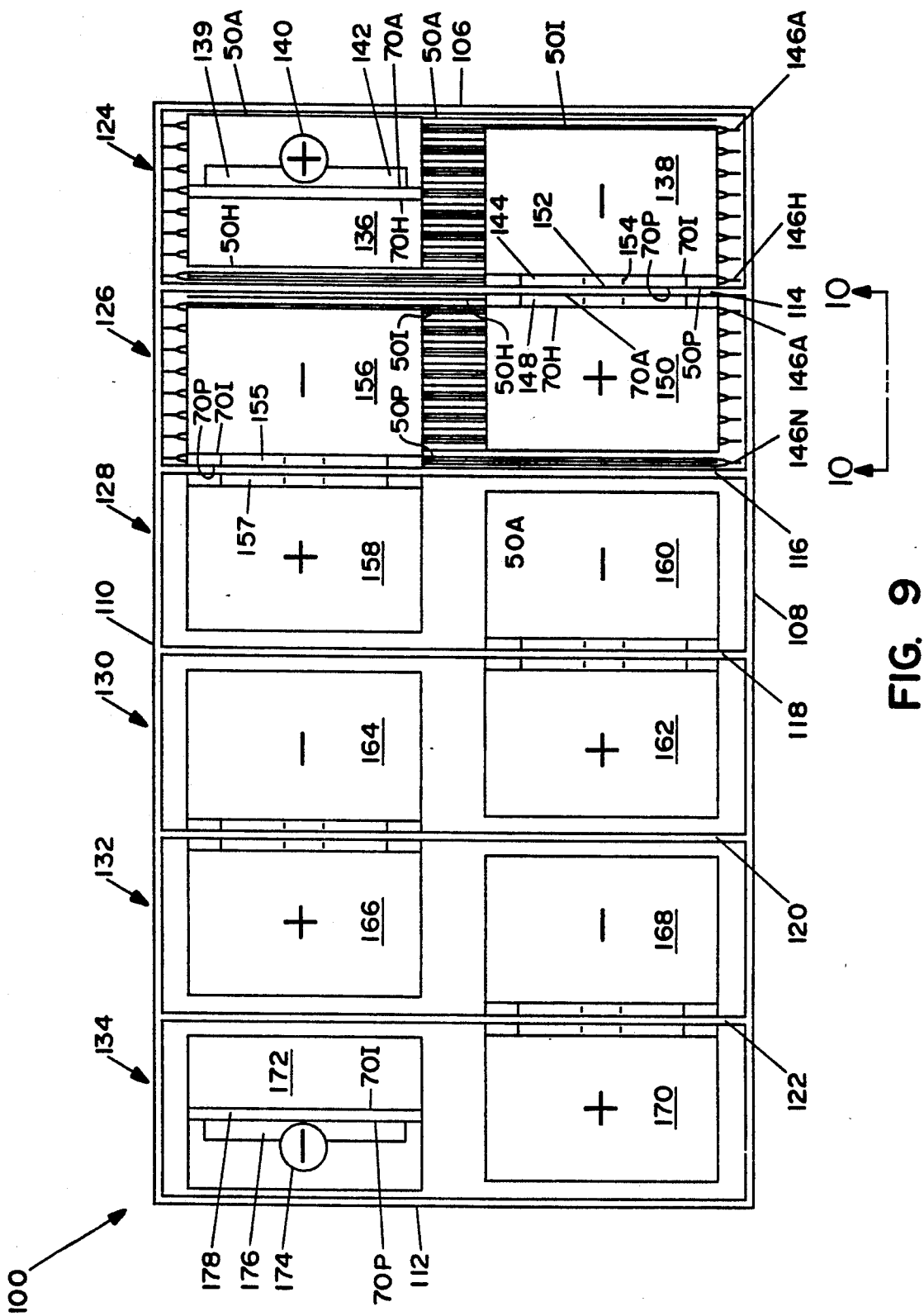
FIG. 9 is a top view of the battery.
Figure 11:
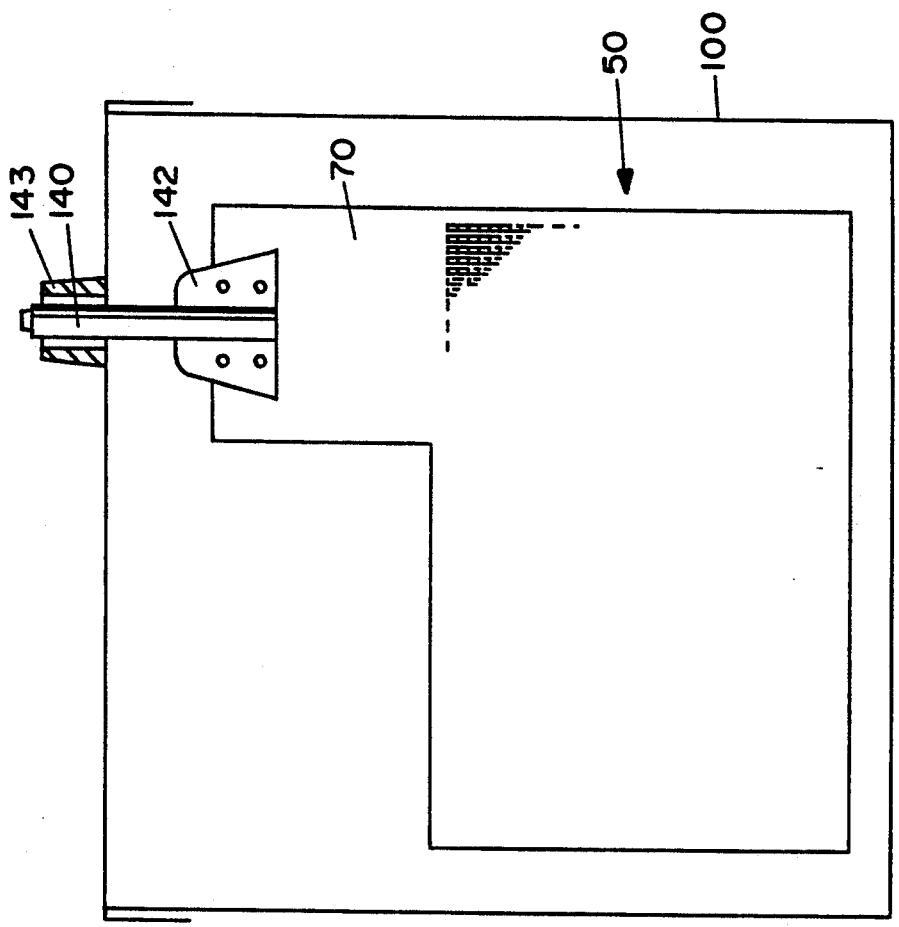
FIG. 11 illustrates the inner terminal post.
Figure 12:
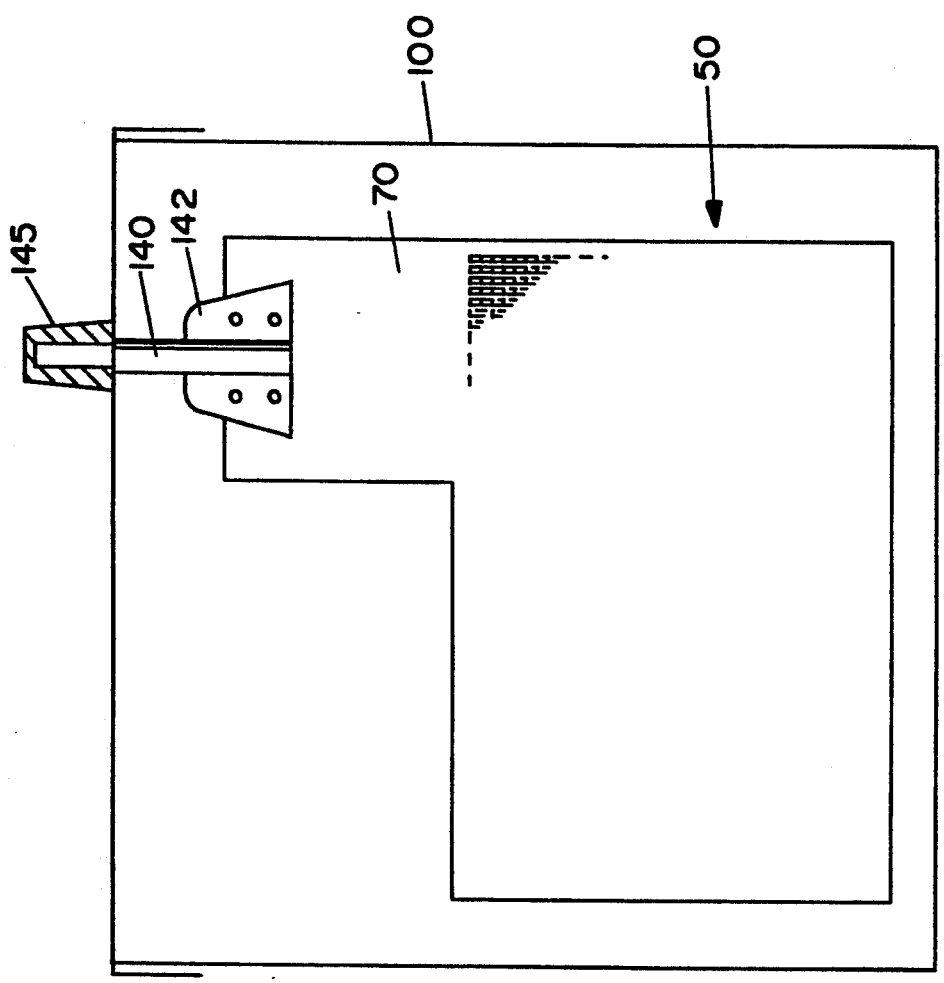
FIG. 12 illustrates a finished terminal.

FIG. 8 illustrates a perspective view in cutaway of a battery 100 where all numerals correspond to those elements previously described. The battery top cover is removed for purposes of brevity and clarity in the drawing. The battery casing 102 includes an outer casing comprised of a bottom 104, sides 106, 108, 110 and 112, and vertical integral panels 114, 116, 118, 120, and 122 which extend between sides 108 and 110 at equal spacing intervals to form integral acid tight cell chambers 124, 126, 128, 130, 132 and 134 as illustrated in FIG. 9. In each cell chamber 124–134 are a plurality of grids 50, including grids 50A–50H and 50I–50P which are arranged in an alternate interleaving of negative plate and positive plate arrays. Leady paste 135 is illustrated adhering to and about the grid 50A. The grids 50A–50H and 50I–50P also have a plurality of tabs 70 including tabs 70A–70H and tabs 70I–70P, respectively, extending from the main body of the grids 50 as previously described. The first positive grid array 136 interleaves with the first negative grid array 138 in the integral acid tight cell chamber 124. The positive array 136 is formed by the grids 50A–50H, the planes of which are parallel to each other. The tabs 70A–70H are bent or formed to physically and electrically connect in successive mutual contact at a point midway between the outermost grids 50A and 50H, and there are electrically and mechanically joined to one another such as by spot welding to form a tab bus 139. A positive battery inner terminal post 140 is integral to and extends from a terminal plate 142 where the terminal plate 142 is joined to the tab bus 139 such as by spot welding. The terminal group connects to the terminal inner post 140. The inner terminal post 140 then fits into a terminal bushing 143 in the cover of FIG. 11. The inner terminal post 140 and the terminal bushing 143 are then autogenously welded ("burned") to form the finished terminal 145 of FIG. 12.

Figure 10:
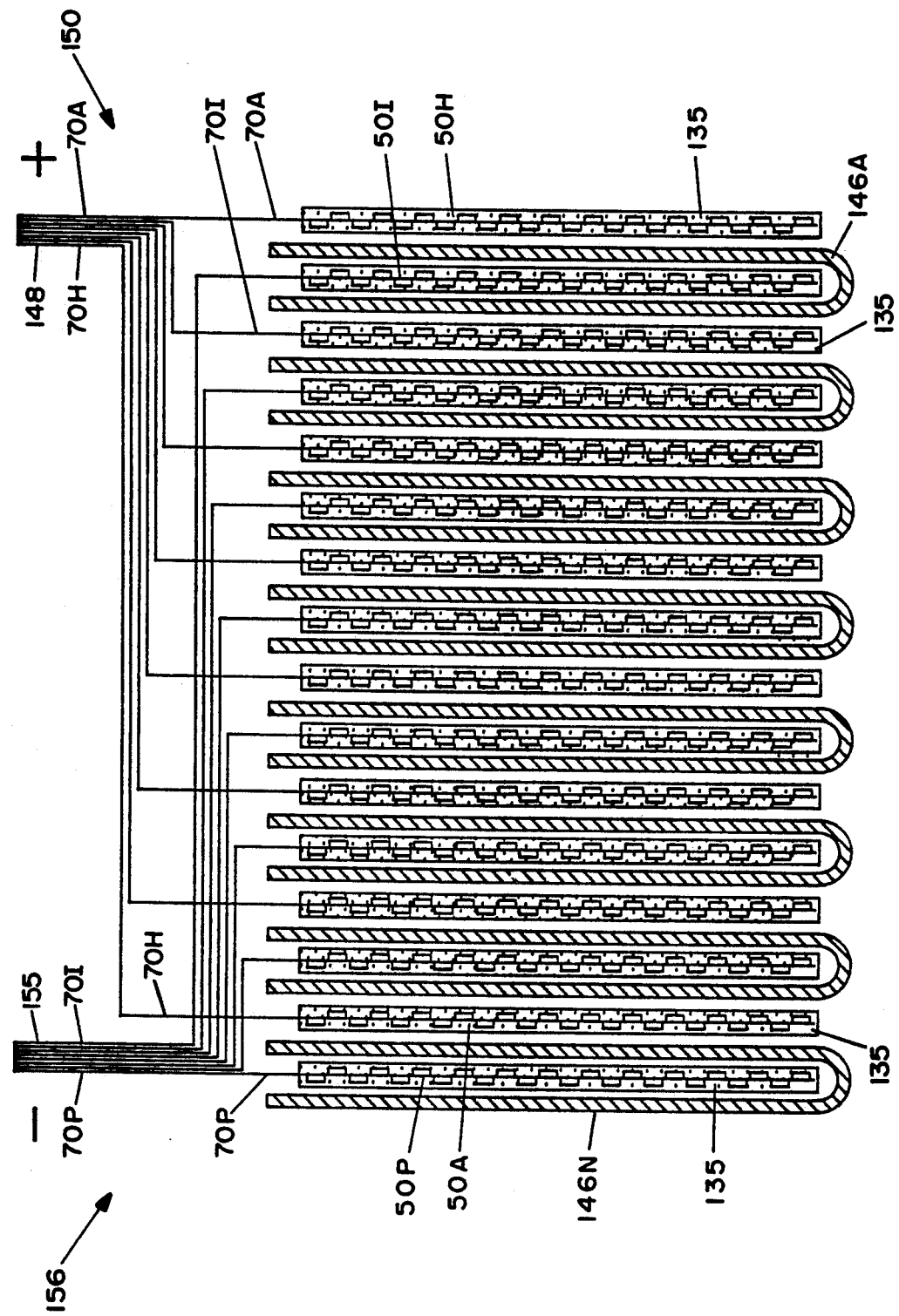
FIG. 10 is an expanded side view taken along line 10—10 of FIG. 9.

The negative grid array 138 is formed in a somewhat similar fashion as the positive grid array 136 by the use of grids 50I–50P. The tabs 70I–70P of the grids 50I–50P are bent or physically formed and come in successive mutual contact at a point adjacent to the integral panel 114 and are electromechanically joined to each other such as by spot welding to form a tab bus 144. A plurality of plastic insulator envelopes 146A-146H, each having an open top, fit over and about either the negative plates 50I-50P or the positive plates 50A-50H to insulate the plates 50A-50H of the first positive grid array 136 from the plates 50I-50P of the first negative grid array 138. FIG. 10 illustrates further the separation of the plates in the positive and negative grid arrays.

FIG. 9 illustrates a top view of the battery 100 where all numerals correspond to those elements previously described. Illustrated in particular is the arrangement in series of the positive and negative interleaved grid array pairs in the cell chambers 124-134. The positive grid array 150 is constructed in the same fashion as the positive grid array 136 with the exception that there is no terminal post and the tabs 70A-70H are bent or formed in a fashion similar to the tabs 70I-70P of the negative grid array 138 to form and bring tab bus 148 adjacent to the panel 114. It is noted that the tab assemblage/array 144 of the first negative grid array 138 and a tab assemblage/array 148 of the second positive grid arrays 150 directly adjacent to each other on opposite sides of the panel 114. A hole 152 in the panel 114 aligns with the tab assemblages 148 and 144 so that a weld 154 electrically joins the bus tabs 148 and 144. This very same method is used throughout the battery 100 to join the positive grid arrays and negative grid arrays in series electrical connection. The second negative grid array 156 is interleaved with the second positive grid array 150 in a manner similar to the interleaving of the first positive grid array 136 and first negative grid array 138. It is appreciated that the arrangement of positive and negative grids in one cell chamber is an inversion of the arrangement in previous cell chamber in succession for series electrical connection, i.e., the plate groups are alternately "right-hand" and "left hand". This pattern is repeated throughout the cell chambers wherein the tab assemblage 155 of the second negative grid array 156 is electromechanically connected to the tab assemblage 157 of the third positive grid array 158 in a similar fashion, thus interleaving and connecting the third positive grid array 158 with the third negative array 160. This sequence repeats with successive positive grid array 162, negative grid array 164, positive grid array 166, negative grid array 168, positive grid array 170 and negative grid array 172. The negative grid includes a negative inner terminal post 174 extending from a terminal plate 176. The terminal plate 176 is welded to a tab assemblage 178 formed by the tabs 70I-70P of the negative grid array 172. All grid plates 50A-50H and 50I--50P, as well as the tabs 70A-70H and 70I-70P and insulator envelopes are not illustrated throughout for purposes of brevity and clarity.

FIG. 10 illustrates a simplified expanded side view along line 10—10 of FIG. 9 of the interleaving of the second positive cell 150 with the second negative cell 156 as found in cell chamber 126 in FIG. 9 where all numerals correspond to those elements previously described.

In operation, the electrochemical reaction of the acid with the chemical coating is known in the battery field. The battery is suitable for use in automobiles, trucks, buses, trains, planes, boats, aircraft, emergency consumer applications, agriculture applications, commercial applications, military applications, and emergency backup applications.

Various modifications can be made to the present invention without departing from the apparent scope hereof.

We claim:
1. Battery for a vehicle comprising:
   a. a battery case with at least one compartment and acid in said compartment;
   b. a plurality of positive grids in said compartment, each of said positive grids having a mean plane and a matrix of raised and lowered portions with respect to said mean plane, said raised and lowered portions forming slots therebetween, and each of said grids having an upwardly extending wide integral positive tab, each of said positive tabs electromechanically connected together by at least two spot welds;
   c. a plurality of negative grids in said compartment, each of said negative grids having a mean plane and a matrix of raised and lowered portions with respect to said mean plane and an upwardly extending wide integral negative tab, each of said negative tabs electromechanically connected together by at least two spot welds and interleaved with each of said positive grids;
   d. a chemical paste over and about each of said grids, and over, about and within each of said slots;
   e. said positive grid tabs interconnected to said adjoining negative grid tabs between and through said adjoining cells;
   f. a cover over said case; and,
   g. terminal posts connected to each of said connected tabs in said case and extending either through said cover or through the side or end of said case.

2. Battery of claim 1 wherein each of said grid plates are pure lead.

3. The battery of claim 1, wherein said raised and lowered portions are arranged in rows, and alternating with said rows for neutral portions approximately in said mean plane and forming neutral rows for conducting current to said tabs.

4. The battery of claim 1, wherein each of the tabs is half the plate with minus clearance in width.

5. Battery for a vehicle comprising:
   a. a battery case with at least one compartment and acid in said compartment;
   b. a plurality of positive grids in said compartment, each of said positive grids having a mean plane and a matrix of raised and lowered portions with respect to said mean plane, said raised and lowered portions forming slots therebetween, and each of said grids having ann upwardly extending wide integral positive tab of approximately 2 ¼"×3", each of said positive tabs electromechanically connected together by at least two spot welds;
   c. a plurality of negative grids in said compartment, each of said negative grids having a mean plane and a matrix of raised and lowered portions with respect to said mean plane, and an upwardly extending wide integral negative tab of approximately 2 ¼"×3", each of said negative tabs electromechanically connected together by at least two spot welds and interleaved with each of said positive grids;
   d. a chemical paste over and about each of said grids, and over, about and within each of said slots;
   e. said positive grid tabs interconnected to said adjoining negative grid tabs between and through said adjoining cells;
   f. a cover over said case; and,
   g. terminal posts connected to each of said connected tabs in said case and extending either through said cover or through the side or end of said case.

* * * * *